US012757818B2

(12) United States Patent
Dai et al.

(10) Patent No.: US 12,757,818 B2
(45) Date of Patent: Oct. 13, 2026

(54) RIDING LAWN MOWER AND CONTROL METHOD THEREOF

(71) Applicant: Nanjing Chervon Industry Co., Ltd., Nanjing (CN)

(72) Inventors: Xiubo Dai, Nanjing (CN); Lei Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 1035 days.

(21) Appl. No.: 17/570,751

(22) Filed: Jan. 7, 2022

(65) Prior Publication Data

US 2022/0124972 A1 Apr. 28, 2022

Related U.S. Application Data

(63) Continuation of application No. PCT/CN2020/100881, filed on Jul. 8, 2020.

(30) Foreign Application Priority Data

Jul. 9, 2019 (CN) ......................... 201910612977.1

(51) Int. Cl.
*A01D 34/00* (2006.01)
*A01D 34/64* (2006.01)
(Continued)

(52) U.S. Cl.
CPC ........... *A01D 34/006* (2013.01); *A01D 34/64* (2013.01); *A01D 34/78* (2013.01); *B62D 11/003* (2013.01); *A01D 2101/00* (2013.01)

(58) Field of Classification Search
CPC ...... A01D 34/006; A01D 34/64; A01D 34/78; A01D 2101/00; B62D 11/003; B62D 11/04; B62D 5/006
(Continued)

(56) References Cited

U.S. PATENT DOCUMENTS 7,283,900 B1 10/2007 Gacioch, Jr.
8,234,026 B2 7/2012 Wyatt
(Continued)

FOREIGN PATENT DOCUMENTS

CN 202340430 U 7/2012
CN 102656988 A 9/2012
(Continued)

OTHER PUBLICATIONS

EPO, extended European search report issued on European patent application No. 20836218.6, dated Jul. 11, 2022, 12 pages.
(Continued)

*Primary Examiner* — Valentin Neacsu
*Assistant Examiner* — Felicia L. Brittman-Alabi
(74) *Attorney, Agent, or Firm* — Greenberg Traurig, LLP

(57) ABSTRACT

A riding lawn mower includes a seat, a power output assembly, a walking assembly, and a control assembly. The power output assembly includes a mowing element and a power output motor configured to drive the mowing element to output power. The walking assembly includes wheels driving the riding lawn mower to walk on a ground, walking motors configured to drive the wheels, and walking controllers controlling the walking motors, where the wheels include driving wheels. An operation assembly includes an electronic steering wheel and a position sensor, the position sensor is disposed in the electronic steering wheel and configured to detect a rotation operation action of a user on an operation member, and a central controller is communicatively connected to the position sensor, acquires a rotation operation instruction, and controls the driving wheels to actively travel at different speeds for steering through the walking controllers.

15 Claims, 13 Drawing Sheets

(51) Int. Cl.
*A01D 34/78* (2006.01)
*B62D 11/00* (2006.01)
*A01D 101/00* (2006.01)

(58) Field of Classification Search
USPC ........................................................ 180/6.48
See application file for complete search history.

(56) References Cited

U.S. PATENT DOCUMENTS

| | | | |
|---|---|---|---|
| 8,668,033 | B2 | 3/2014 | Koike |
| 9,210,839 | B2 | 12/2015 | Schygge |
| 10,106,027 | B1 * | 10/2018 | Keller ...................... B60K 1/02 |
| 2008/0001558 | A1 | 1/2008 | Kikuchi et al. |
| 2013/0282214 | A1 | 10/2013 | Goebel |
| 2014/0144117 | A1 | 5/2014 | Schygge |
| 2014/0266664 | A1 | 9/2014 | Dwyer |
| 2014/0298767 | A1 | 10/2014 | Piontek |
| 2016/0242356 | A1 | 8/2016 | Velderman |
| 2018/0092299 | A1 | 4/2018 | Dombrowski et al. |
| 2020/0205338 | A1 | 7/2020 | Zeiler et al. |

FOREIGN PATENT DOCUMENTS

| | | | | | |
|---|---|---|---|---|---|
| CN | 104443008 | A | | 3/2015 | |
| CN | 102448283 | A | | 4/2015 | |
| CN | 102658781 | A | | 9/2015 | |
| CN | 204598688 | U | | 9/2015 | |
| CN | 205454604 | U | | 8/2016 | |
| CN | 108781704 | A | | 11/2018 | |
| CN | 109937679 | A | | 6/2019 | |
| EP | 1319577 | A2 | | 6/2003 | |
| EP | 1541446 | A2 | | 6/2005 | |
| EP | 2082916 | A1 | * | 7/2009 | ............. B62D 6/008 |
| EP | 2110295 | A2 | | 10/2009 | |
| EP | 3501947 | A1 | | 6/2022 | |
| JP | H1167019 | A | * | 3/1999 | |
| JP | 2024017956 | A | * | 2/2024 | |

OTHER PUBLICATIONS

ISA/CN, International Search Report issued on PCT application No. PCT/CN2020/100881, dated Sep. 28, 2020, 10 pages.
ISA/CN, English translation of International Search Report issued on PCT application No. PCT/CN2020/100881, dated Sep. 28, 2020, 3 pages.
ISA/CN, Written Opinion issued on PCT application No. PCT/CN2020/100881, dated Sep. 28, 2020, 4 pages.
ISA/CN, English translation of Written Opinion issued on PCT application No. PCT/CN2020/100881, dated Sep. 28, 2020, 4 pages.

* cited by examiner

RIDING LAWN MOWER AND CONTROL METHOD THEREOF

RELATED APPLICATION INFORMATION

This application claims the benefit of Chinese Patent Application No. 201910612977.1, filed on Jul. 9, 2019, the disclosure of which is incorporated herein by reference in its entirety.

TECHNICAL FIELD

The present application relates to an electric tool, for example, a riding lawn mower and a control method thereof.

BACKGROUND

With the advent of a riding lawn mower, a structure of the riding lawn mower becomes more and more complicated with an increase of functions. The riding lawn mower not only needs to perform functional tasks such as mowing but also needs to be controlled by a user to travel. In the related art, the riding lawn mower is mainly powered by fuel, which is noisy and causes high pollution. The riding lawn mower which uses electric power as an energy source is typically controlled through an operating rod, which is not conducive to operation and use by a beginner and requires the user to adjust directions of operating rods on both sides.

To control the riding lawn mower to steer so as to meet the need of mowing, it is necessary to enable the riding lawn mower to steer at a flexible angle. However, in the related art, for the beginner that operates the riding lawn mower, steering operations increase mowing energy and time, which is not conducive to efficient maintenance of a lawn.

SUMMARY

Examples of the present application provide a control system of a riding lawn mower, where an electronic operation member is adopted to control the riding lawn mower to operate and effectively improves operation stability of the riding lawn mower and optimizes operation experience.

Examples of the present application provide a control method of a riding lawn mower, where a steering wheel is adopted to control the riding lawn mower to operate and can flexibly control the riding lawn mower to steer. Operations are simple and sensitive.

Examples of the present application provide a riding lawn mower including a seat, a power output assembly, a walking assembly, and a control assembly. The seat is for a user to ride on. The power output assembly includes a mowing element configured to output power so as to implement a mowing function and a power output motor configured to drive the mowing element to output the power. The walking assembly includes wheels driving an electric riding lawn mower to walk on a ground, walking motors configured to drive the wheels, and walking controllers controlling the walking motors, where the wheels include driving wheels formed on two sides. An operation assembly includes an electronic steering wheel and a position sensor, the position sensor is disposed in the electronic steering wheel and configured to detect a rotation operation action of the user on an operation member, and a central controller is communicatively connected to the position sensor, acquires a rotation operation instruction, and controls rear wheels to actively travel at different speeds for steering through the walking controllers.

Examples of the present application provide a riding lawn mower including a seat, a power output assembly, a walking assembly, and a control assembly. The seat is for a user to ride on. The power output assembly includes a mowing element configured to output power so as to implement a mowing function and a power output motor configured to drive the mowing element to output the power. The walking assembly includes wheels driving an electric riding lawn mower to walk on a ground and walking motors configured to drive the wheels. An operation assembly includes an electronic steering wheel, a speed operation member and a position sensor, the position sensor is disposed in the electronic steering wheel and configured to detect a rotation operation action of the user on an operation member, the speed operation member is connected to the central controller and configured to control acceleration, and a central controller is communicatively connected to the position sensor, acquires a rotation operation instruction, and applies a negative torque to a wheel on an inner side in a rotation process to decelerate the wheel on the inner side for steering.

Examples of the present application provide a riding lawn mower including a seat, a power output assembly, a walking assembly, and a control assembly. The seat is for a user to ride on. The power output assembly includes a mowing element configured to output power so as to implement a mowing function and a power output motor configured to drive the mowing element to output the power. The walking assembly includes wheels driving an electric riding lawn mower to walk on a ground, walking motors configured to drive the wheels, walking controllers controlling the walking motors, and state sensors detecting states of the wheels, where the wheels include driving wheels formed on two sides. An operation assembly includes an operation member; a central controller connected to the operation member is configured to control the riding lawn mower to operate according to an action of the operation member. The operation assembly further includes an auxiliary motor and an auxiliary controller controlling the auxiliary motor, where the auxiliary motor is coupled to the operation member, and the auxiliary controller generates a feedback instruction according to the states of the wheels detected by the state sensors and controls the auxiliary motor to apply force feedback to the operation member.

Examples of the present application provide a method for controlling force feedback for a steering wheel of a riding lawn mower including steps described below. A rotation direction of the steering wheel is acquired and a direction of the force feedback is determined. A rotation angle and angular acceleration of rotation of the steering wheel, rotational speeds of wheels, and a differential speed between a first driving wheel and a second driving wheel are acquired and an adjustment factor is determined. A magnitude of the force feedback outputted to the steering wheel is controlled according to the adjustment factor.

Examples of the present application provide a walking control method of a riding lawn mower including steps described below. In S1, a position sensor acquires a steering signal from a steering operation member and a speed signal from a speed operation member. In S2, target driving rotational speeds of a first driving wheel and a second driving wheel are analyzed according to the steering signal and the speed signal. In S3, state sensors acquire actual rotational speeds of the first driving wheel and the second driving wheel. In S4, target torque current components of a first motor and/or a second motor are determined according to the actual rotational speeds and the target driving rotational speeds. In S5, the first driving wheel and the second driving wheel are controlled to travel at target driving speeds so that the riding lawn mower steers or travels along a straight line.

DETAILED DESCRIPTION

Figure 1:
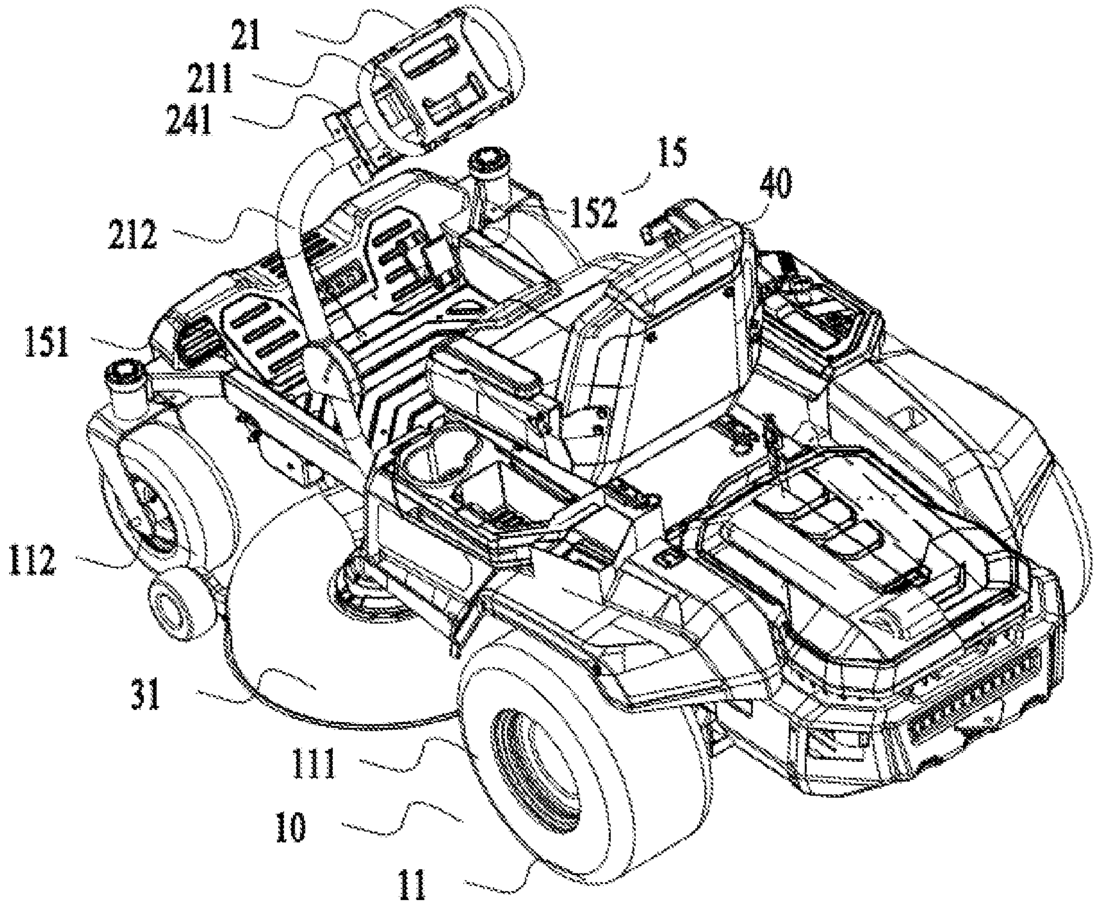
FIG. 1 is a perspective view of a riding lawn mower according to an example of the present application.
Figure 2:
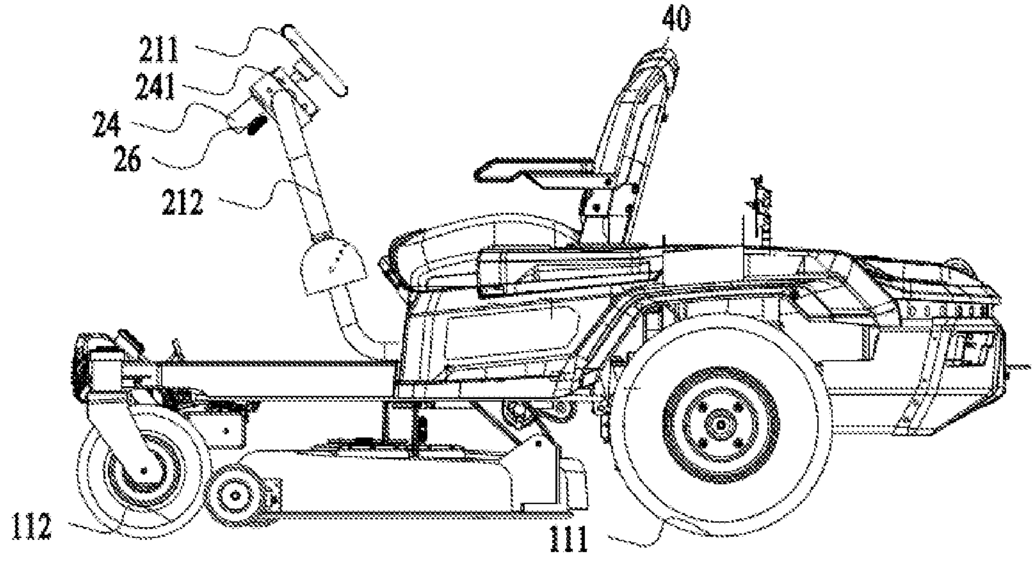
FIG. 2 is a side view of a riding lawn mower according to an example of the present application.
Figure 3:
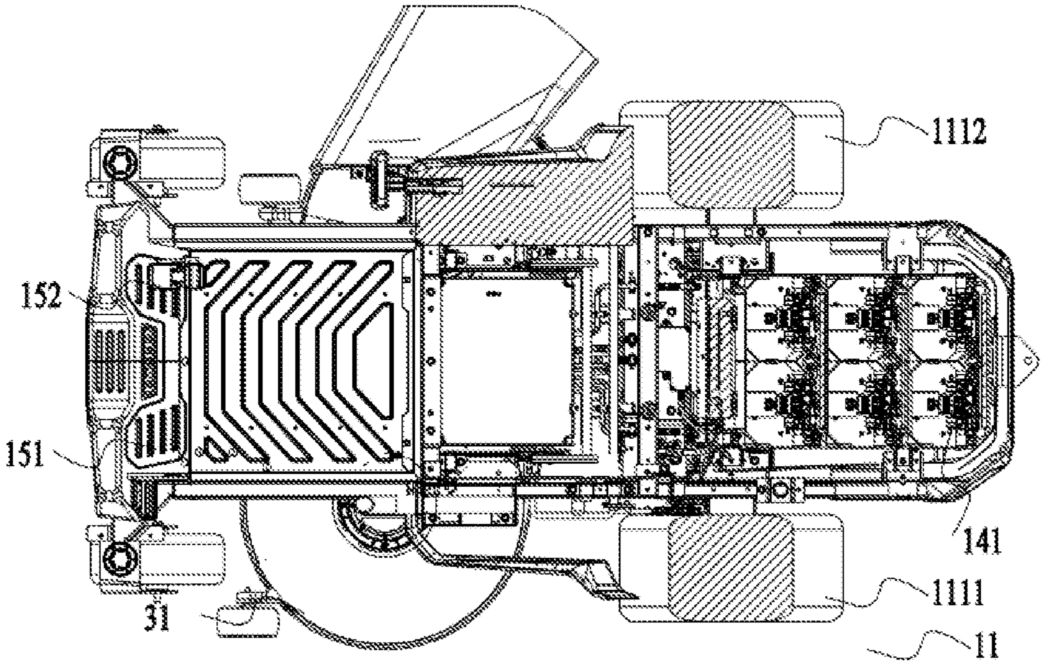
FIG. 3 is a sectional view of a riding lawn mower according to an example of the present application.

FIG. 1 is a perspective view of a riding lawn mower according to an example of the present application. FIG. 2 is a side view of a riding lawn mower according to an example of the present application. FIG. 3 is a sectional view of a riding lawn mower according to an example of the present application. As shown in FIG. 1, the riding lawn mower includes a power output assembly 30 for performing a mowing task and a walking assembly 10 for performing a walking action, i.e., for moving the lawn mower over a surface. The power output assembly 30 includes a mowing element 31, a power output motor 32, and a mowing controller 514 controlling the power output motor 32. The mowing element 31 is generally configured to be a cutting blade. The mowing element 31 is connected to the power output motor 32 which operates to drive the mowing element 31 to rotate for performing a cutting action. The riding lawn mower further includes a power supply device for supplying an energy source.

The riding lawn mower further includes a control system for controlling the riding lawn mower to operate. The control system includes an operation assembly for a user to operate so as to control the walking assembly 10 and the power output assembly 30 to operate. The operation assembly includes a steering operation member, a speed operation member, and an output operation member. The steering operation member is used for inputting steering control of the riding lawn mower, the speed operation member is used for outputting speed control of the riding lawn mower, and the output operation member is used for controlling the riding lawn mower to operate and perform mowing.

The control system further includes a control module and a sensing module. The control module includes controllers for controlling the riding lawn mower to operate, such as a central controller 511 and a mowing sensor. The sensing module includes at least a position sensor 521 disposed in an operation member and used for detecting an operation action of the user on the operation member. The central controller 511 is communicatively connected to the position sensor 521, receives an operation instruction of the user through the position sensor 521, and converts the operation instruction into a corresponding control instruction. The operation member may include a steering wheel 21. The user controls a traveling direction of the riding lawn mower by operating the steering wheel 21.

Figure 4:
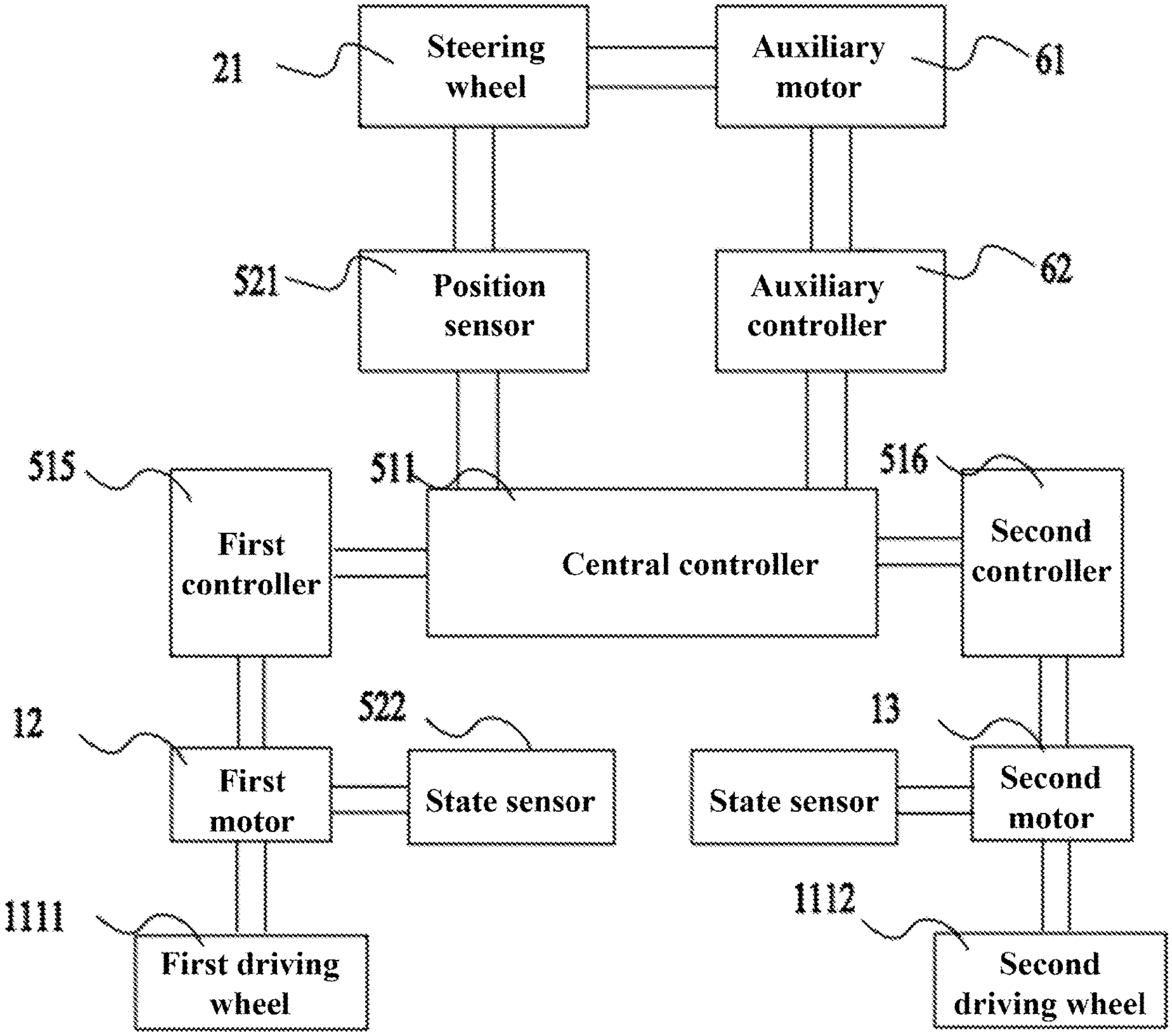
FIG. 4 is a block diagram of a control system of a riding lawn mower according to an example of the present application.
Figure 5:
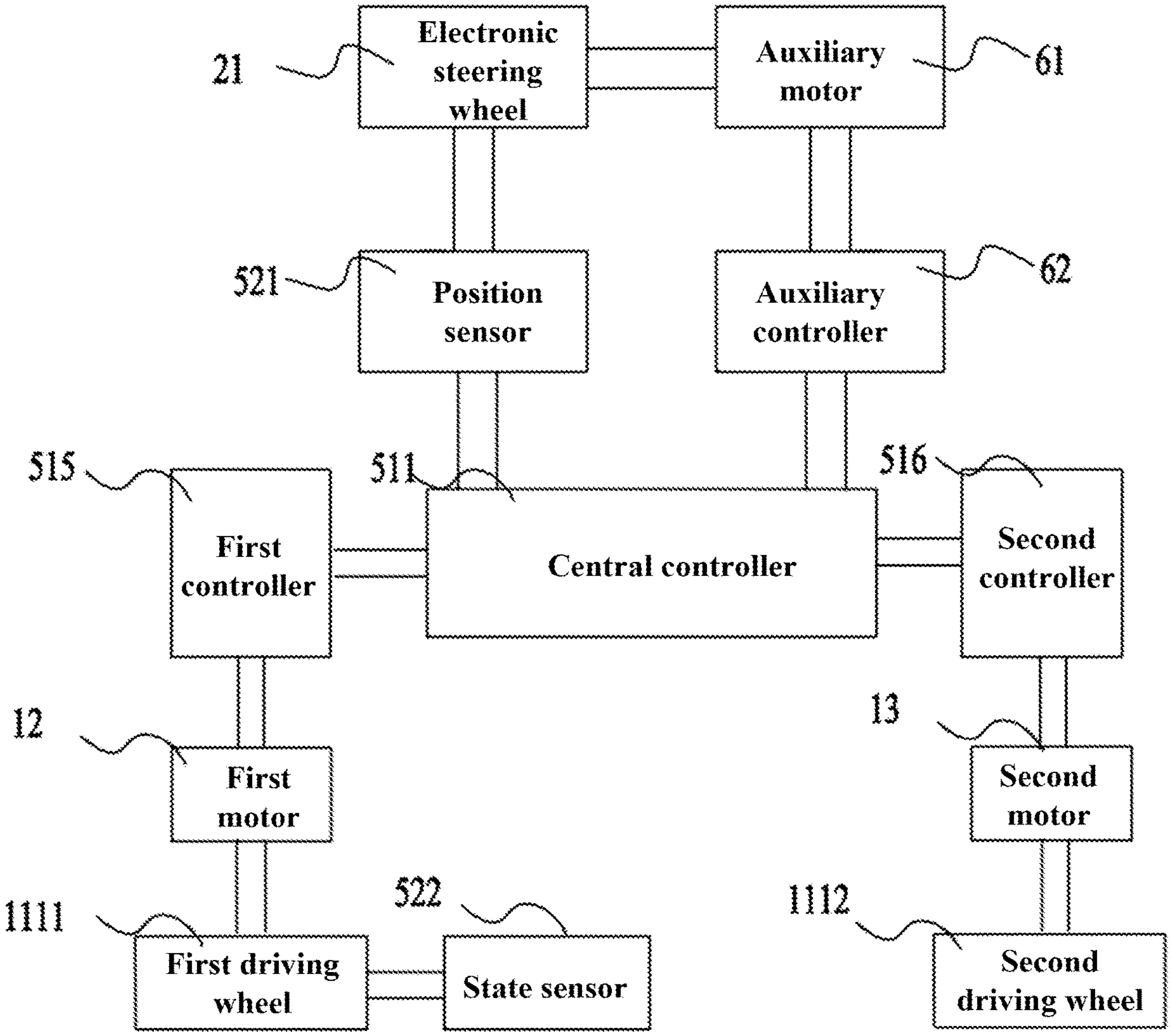
FIG. 5 is a block diagram of a control system of a riding lawn mower according to an example of the present application.

FIG. 4 is a block diagram of a control system of a riding lawn mower according to an example of the present application. FIG. 5 is a block diagram of a control system of a riding lawn mower according to an example of the present application. The walking assembly 10 includes wheels 11, a first motor 12, and a second motor 13. The wheels 11 include front wheels 112 and rear wheels 111. Optionally, the front wheels 112 are universal wheels and the rear wheels 111 are driving wheels. The number of the rear wheels 111 is two. The rear wheels 111 include a first driving wheel 1111 and a second driving wheel 1112. The number of the front wheels 112 may be two, one, or zero. The first motor 12 is connected to the first driving wheel 1111 and configured to drive the first driving wheel 1111 to rotate. The second motor 13 is connected to the second driving wheel 1112 and configured to drive the second driving wheel 1112 to rotate. The power output assembly 30 further includes walking controllers 512 workably connected to the central controller 511. The walking controllers 512 are communicatively connected to the first motor 12 and the second motor 13. The central controller 511 receives the operation instruction from the user, analyzes the operation instruction, converts the operation instruction into a control instruction for the first motor 12 and the second motor 13, and sends the control instruction to the walking controllers 512. The walking controllers 512 control the first motor 12 and the second motor 13 to operate according to the control instruction. The preceding communicative connection may be a wired connection through a communication wire or a wireless connection. The walking assembly 10 further includes output shafts coupled to the first motor 12 and the second motor 13. The output shafts are connected to the first driving wheel 1111 and the second driving wheel 1112 respectively, and the driving wheels are driven by walking motors through the output shafts to move the mower across a surface.

The riding lawn mower further includes a seat 40 for the user to ride on and a chassis supporting the seat 40 and the wheels 11. The seat 40 is mounted on the chassis, the steering wheel 21 is disposed in front of the seat 40, and the user riding on the seat 40 operates the steering wheel 21 to control the traveling direction of the riding lawn mower. Optionally, two walking controllers 512 are provided, which are a first controller 515 and a second controller 516, respectively. The first controller 515 is communicatively connected to the first motor 12 to control the first motor 12 to operate. The second controller 516 is communicatively connected to the second motor 13 to control the second motor 13 to operate. The first controller 515 and the second controller 516 are communicatively connected to the central controller 511 separately, and the central controller 511 sends the control instruction converted according to the operation instruction of the user to the first controller 515 and the second controller 516 separately so as to control traveling speeds of the first driving wheel 1111 and the second driving wheel 1112.

For example, in another example, one central controller 511 may control the first motor 12 and the second motor 13 so as to control rotational speeds of the first driving wheel 1111 and the second driving wheel 1112.

In one example of the present application, the steering operation member is implemented as the steering wheel 21 and the speed operation member is implemented as a speed pedal. The steering wheel 21 includes an operation plate 211 and a shaft body. The operation plate 211 may be circular or elliptical in shape so that the operation plate 211 is convenient for the user to operate. One end of the shaft body is connected to a bottom of the operation plate 211, and the other end of the shaft body is connected to the chassis. Optionally, one end of the shaft body is connected to a side end of the chassis and extends upwards for a preset distance and then extends towards directly a front of the seat, which reduces an overall space of the riding lawn mower occupied by the operation assembly and improves driving comfort of the user. Optionally, the steering wheel 21 is provided with buttons for controlling the riding lawn mower, such as a starting member and a light button. Optionally, the output operation member may be disposed on the steering wheel 21, and the user may operate the steering wheel to control a mowing process of the riding lawn mower while controlling the riding lawn mower to travel. The preceding buttons are connected to the central controller 511 by sending electric signals in a wireless or wired manner so as to send operation instructions which are processed and executed by the central controller 511.

Optionally, the shaft body has a hollow design, and a signal wire and/or a power supply wire for connecting the operation assembly and the walking assembly 10 are provided inside the shaft body so as to protect and arrange the signal wire and the power supply wire.

The user rotates the steering wheel to send out a steering instruction for the riding lawn mower. The position sensor 521 includes at least a first position sensor. The first position sensor 521 detects a rotation angle of the steering wheel 21 operated by the user and transmits a detected displacement angle to the central controller 511. The central controller 511 converts the rotation angle of the steering wheel 21 into a steering signal, which is a corresponding steering angle of the riding lawn mower. The central controller 511 transmits the steering signal to the first controller 515 and the second controller 516. The first controller 515 and the second controller 516 control the first driving wheel 1111 and the second driving wheel 1112 to travel at different speeds, or the central controller 511 directly controls the first driving wheel 1111 and the second driving wheel 1112 to travel at different speeds so that the riding lawn mower steers according to an operation of the user on the steering wheel 21.

In another example, the control module further includes an operation controller configured to analyze an operation of the user on the operation assembly, generate a corresponding operation instruction, and transmit the operation instruction to the central controller 511 so as to control a driver for steering. In this case, the first position sensor 521 detects a rotation displacement of the steering wheel 21 operated by the user and transmits the displacement angle to the operation controller. The operation controller converts the displacement angle into a corresponding steering signal and transmits the steering signal to the central controller 511. The central controller 511 transmits a control signal to directly control the first driving wheel 1111 and the second driving wheel 1112 to travel at different speeds. Alternatively, the central controller 511 transmits the control signal to the first controller 515 and the second controller 516, and the first controller 515 and the second controller 516 respectively control the first motor 12 and the second motor 13 to drive the first driving wheel 1111 and the second driving wheel 1112 to travel at different speeds so that the riding lawn mower steers in correspondence to rotation of the steering wheel 21 controlled by the user.

In some examples of the present application, the first position sensor 521 includes a rotation member and a fixed member which are disposed opposite to each other. The rotation member is disposed in the operation plate 211 and the fixed member is disposed adjacent to the shaft body or an auxiliary motor 61. The rotation member is driven by the user to rotate, and a relative position relationship between the rotation member and the fixed member is changed so that an operation action of the user on the steering wheel 21 is acquired. Optionally, the fixed member and the rotation member are implemented as a Hall sensor, that is, the Hall sensor is disposed in the fixed member, and at least part of the rotation member is provided as a magnetic member so that the rotation of the steering wheel 21 is detected through a Hall principle. In another example, the first position sensor 521 is provided as a capacitance sensor, and a rotation displacement of the steering wheel 21 is read through a change in capacitance.

In an example, the steering wheel 21 has an initial state. With an origin or a standard axis as reference, the initial state corresponds to a state of traveling along a straight line or stopping. The direct front of the steering wheel 21 is aligned with the origin or the standard axis. When the user operates the steering wheel 21 to rotate, the first position sensor 521 detects a rotation angle of the steering wheel 21 relative to the origin or the standard axis and generates a corresponding steering instruction. For example, the rotation angle of the steering wheel 21 has a one-to-one correspondence to the steering angle of the riding lawn mower. For example, the rotation angle of the steering wheel 21 is proportional to or a function of the steering angle of the riding lawn mower. A conversion algorithm of the rotation angle of the steering wheel 21 and the steering angle of the riding lawn mower is stored in the operation controller or the central controller 511 so as to generate the corresponding steering instruction according to the rotation angle of the steering wheel 21.

In another example of the present application, the first position sensor 521 is implemented to detect an absolute position displacement of the steering wheel 21, that is, an absolute rotation angle of the steering wheel 21 and analyze the absolute rotation angle as an instruction to control the riding lawn mower to steer. In this case, the steering wheel 21 does not need to return to the origin and each absolute rotation angle of the steering wheel 21 is acquired as the rotation angle of the steering wheel 21 operated by the user, and the rotation angle of the steering wheel 21 has a one-to-one correspondence to the steering angle of the riding lawn mower. For example, the rotation angle of the steering wheel 21 is proportional to or a function of the steering angle of the riding lawn mower. A conversion algorithm of the rotation angle of the steering wheel 21 and the steering angle of the riding lawn mower is stored in the operation controller or the central controller 511 so as to generate the corresponding steering instruction according to the rotation angle of the steering wheel 21.

The speed pedal is disposed on the chassis and used for controlling a traveling speed of the riding lawn mower. In an example, the position sensor 521 further includes a second position sensor 521 configured to detect the speed pedal. The second position sensor 521 is used for detecting an operation of the user on the speed pedal. The user transmits a speed control instruction by stepping on the speed pedal. Optionally, the speed pedal is configured to have an initial state, that is, the speed pedal is in the initial state when the user does not apply a force to the speed pedal and correspondingly the traveling speed of the riding lawn mower is zero. The user applies an action force to the speed pedal so that the speed pedal moves downwards. An angle by which the speed pedal moves downwards has a one-to-one correspondence to the traveling speed of the riding lawn mower. Correspondingly, the angle by which the speed pedal moves downwards is proportional to or a function of the traveling speed of the riding lawn mower. A conversion algorithm of the angle by which the speed pedal moves downwards and the traveling speed of the riding lawn mower is preset in an operation sensor or a central sensor. The operation sensor or the central sensor calculates a corresponding traveling speed.

The walking assembly 10 further includes state sensors 522 configured to detect walking states. The state sensors 522 are used for detecting states of the first motor 12 and the second motor 13. Optionally, the state sensors 522 include current sensors for acquiring currents used by the first motor 12 and the second motor 13. The state sensors 522 may further include the position sensor 521 for detecting rotational speeds of the first motor 12 and the second motor 13 so as to acquire the rotational speeds of the first driving wheel 1111 and the second driving wheel 1112, or the state sensors 522 directly acquire the rotational speeds of the first driving wheel 1111 and the second driving wheel 1112 through the position sensor 521. For example, the state sensors 522 may also be provided as pressure sensors and detect torques of the first motor 12 and the second motor 13 so as to acquire the walking states. In an example, the state sensors 522 may also be disposed on the wheels 11 or the output shafts. The state sensors 522 are implemented as position sensors 521 such as the Hall sensors and used for directly detecting current rotational speeds of the wheels 11. The state sensors 522 include, but are not limited to, any number of other devices such as gyroscopes, accelerometers, inertial measurement units, barometers, magnetometers, and communication devices.

In this example, the first motor 12 and the second motor 13 are each a brushless motor having a three-phase winding wound around a stator. The control system further includes a driver circuit, and the control module is electrically connected to the driver circuit and controls the driver circuit to operate. The driver circuit is electrically connected to the first motor 12, the second motor 13, and the power supply device and drives the first motor 12 and the second motor 13 to operate according to the control signal outputted from the control module. The driver circuit is electrically connected to the three-phase windings of the first motor 12 and the second motor 13 separately and has at least a switching circuit used for driving rotors of the electric motors to rotate according to the control signal from the control module.

In order to rotate an electric motor, the driver circuit has multiple driving states. In one driving state, a stator winding of the electric motor generates one magnetic field and the control module is configured to output a corresponding driving signal to the driver circuit according to a rotation position of a rotor of the electric motor so that the driver circuit switches the driving state. In this manner, states of a voltage and/or a current loaded on the winding of the electric motor are changed, and an alternating magnetic field is generated to drive the rotor to rotate so that the electric motor is driven. A current of the electric motor and/or a voltage of the electric motor are sampled, and the control module calculates and analyzes the current of the electric motor and/or the voltage of the electric motor so that a position of the rotor of the electric motor can be obtained.

The driver circuit includes switching elements VT1, VT2, VT3, VT4, VT5, and VT6. The switching elements VT1, VT2, VT3, VT4, VT5, and VT6 form a three-phase bridge, where VT1, VT3, and VT5 are upper bridge switches, VT2, VT4, and VT6 are lower bridge switches, and an upper bridge switch and a lower bridge switch of a bridge circuit of each phase are connected to the same winding. Field-effect transistors and insulated-gate bipolar transistors (IGBT) may be used as the switching elements VT1 to VT6. A gate terminal of each switching element is electrically connected to the control module, and a drain or a source of each switching element is electrically connected to the winding of the electric motor. The switching elements VT1 to VT6 change connection states according to the driving signal outputted by the control module so that states of a voltage and/or a current loaded by the power supply device to the winding of the electric motor are changed and the electric motor is driven to operate.

Therefore, the present application provides a control method of the electric motor. By the method, a control signal which varies with the position of the rotor can be outputted according to a sampled current of the electric motor to control the driver circuit so that an input voltage and/or current of the electric motor changes approximately by a sine wave, the electric motor has more current states, the more current states can be combined into multiple vector torques in approximately continuous directions, these vector torques move approximately along a circumference, the rotor of the electric motor rotates synchronously with the multiple vector torques moving approximately along the circumference, and thus efficiency of the whole machine is improved.

Figure 13:
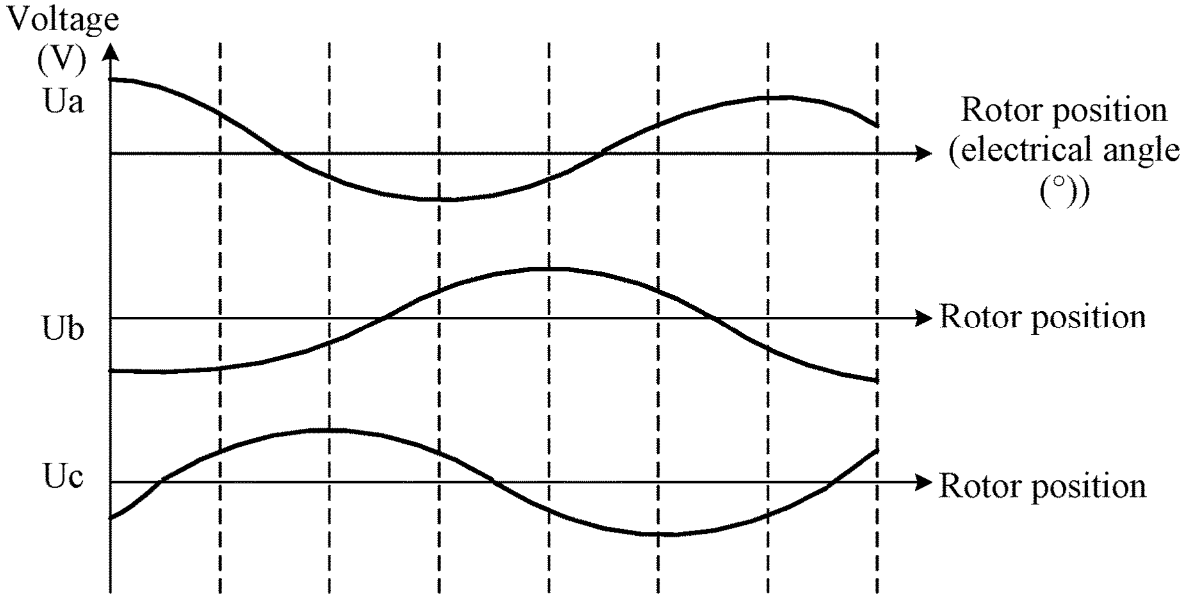
FIG. 13 is a graph illustrating voltages of phases inputted into an electric tool according to an example, where a voltage curve approximately forms a sine wave.
Figure 14:
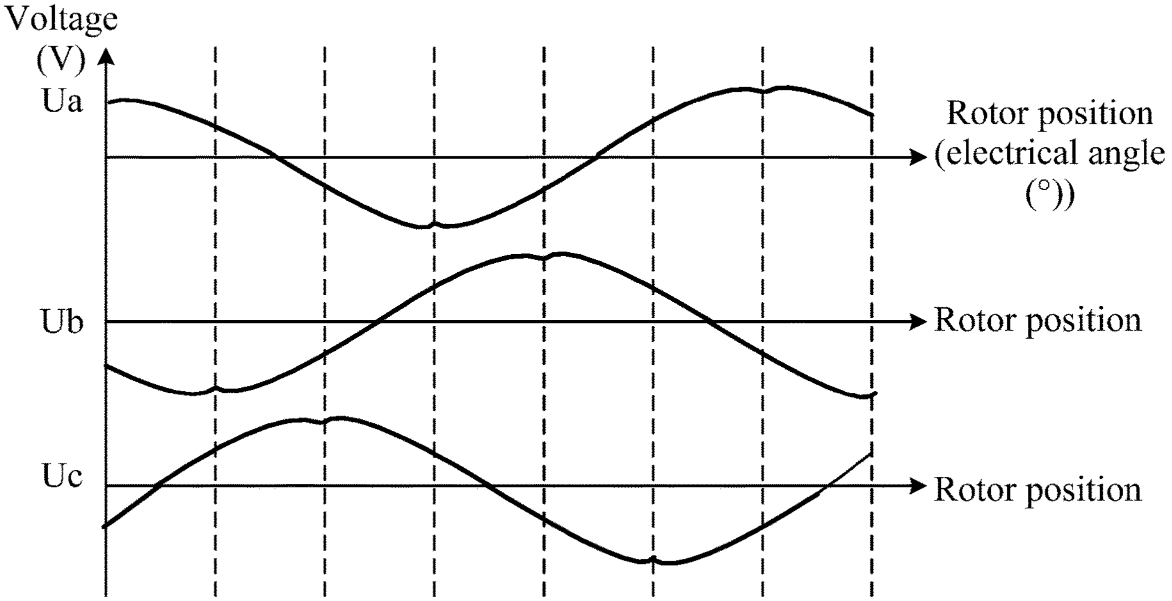
FIG. 14 is a graph illustrating voltages of phases inputted into an electric tool according to another example, where a voltage curve approximately forms a saddle-shaped wave.

The control module 51 can perform a series of processing to generate a pulse-width modulation (PWM) signal according to calculations of the sampled current and other data of the electric motor so that the corresponding driving signal can be outputted to control the driver circuit to work. Therefore, at least one switching element of the driver circuit changes an on/off state, and the voltage inputted into the electric motor approximately forms a sine wave (as shown in FIG. 13) or a saddle-shaped wave (as shown in FIG. 14). Such voltages or currents can be combined into multiple vector torques in approximately continuous directions, and the rotor of the electric motor rotates synchronously with the multiple vector torques moving approximately along a circumference, thus improving the efficiency of the whole machine and increasing an output speed in the case where the same torque is outputted. FIG. 13 and FIG. 14 show merely a relationship between voltages (Ua, Ub, and Uc) of the phases of the electric motor and the position of the rotor. A phase difference between the voltages of the phases is 120 degrees. Similarly, currents of the phases of the electric motor also approximately form a sine wave relative to the position of the rotor. A phase difference between the currents of the phases is 120 degrees. That is, a direction and a magnitude of the voltage of each phase or the current of each phase inputted into the electric motor both vary with the position of the rotor.

In an example, maximum traveling speeds of the first driving wheel 1111 and the second driving wheel 1112 of the riding lawn mower are controlled by the speed pedal, the steering signal is transmitted by the steering wheel 21, and the first driving wheel 1111 and the second driving wheel 1112 are controlled, according to the steering signal, to travel at different speeds so as to complete the steering control corresponding to the steering signal transmitted by the steering wheel 21. Optionally, a traveling state of the riding lawn mower is controlled in a closed-loop manner: the rotation displacement of the steering wheel 21 is analyzed to acquire the steering signal, a displacement of the speed pedal is analyzed to acquire a speed signal, corresponding target driving rotational speeds of the first driving wheel 1111 and the second driving wheel 1112 are calculated, real-time rotational speeds of the first driving wheel 1111 and the second driving wheel 1112 are acquired according to the state sensors 522, an speed adjustment signal is generated according to the real-time rotational speeds, the steering signal, and the speed signal, where the speed adjustment signal includes a rotational speed of a first wheel and a rotational speed of a second wheel. Optionally, the torques of the first motor 12 and the second motor 13 are controlled so that the rotational speed of the first wheel and the rotational speed of the second wheel are controlled.

Figure 7:
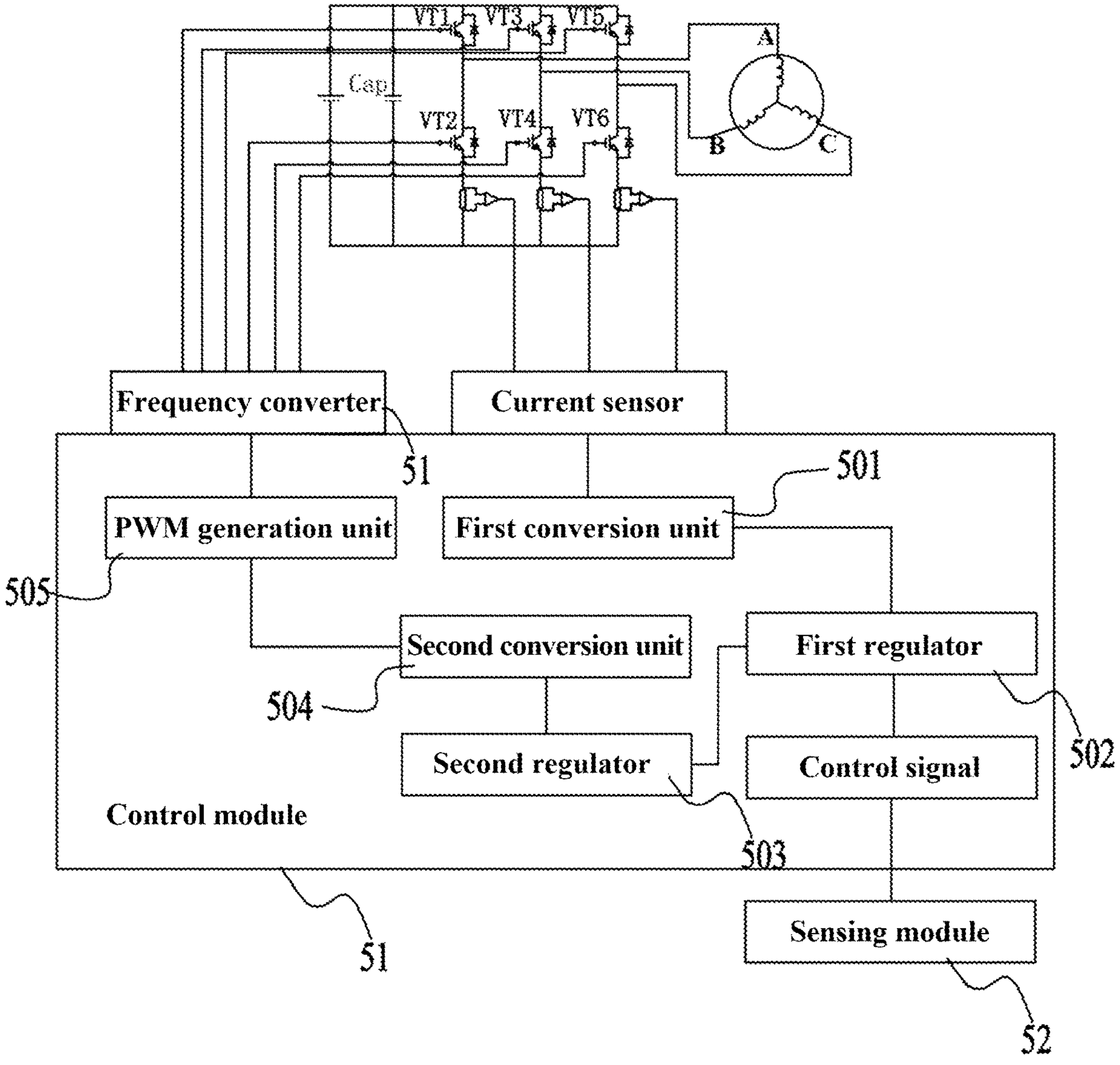
FIG. 7 is a block diagram illustrating an operation of a control module of a riding lawn mower according to an example of the present application.

FIG. 7 is a block diagram illustrating an operation of a control module of a riding lawn mower according to an example of the present application. For example, logics for controlling the rotational speeds of the first driving wheel 1111 and the second driving wheel 1112 are described below. Using the first driving wheel 1111 as an example, the control module acquires a sampled current of the first motor 12 detected by the state sensor 522 to acquire a real-time rotational speed of the first motor 12, and the control module simultaneously acquires the steering signal detected by the position sensor 521 to acquire a target driving rotational speed of the first motor 12. The control module adjusts an output torque of the first motor 12 according to the sampled current, an actual rotational speed of the first motor 12, and a target rotational speed of the first motor 12 so as to control the rotational speed of the first driving wheel 1111. Optionally, the control module may be the central controller 511 or the first controller 515. The rotational speed of the first driving wheel 1111 may be directly detected by the position sensor 521 disposed on the first driving wheel 1111 or the first motor 12.

The control module further includes a first regulator 502. The first regulator 502 performs comparison, adjustment, or conversion according to the target rotational speed of the first motor 12 and the actual rotational speed of the first motor 12, acquires a current position of the first motor 12, and obtains a target torque current component Iq1 and a target exciting current component Id2. In an example, the first regulator 502 is implemented as a target torque current component generation unit and linearly combines a proportion and an integral of a deviation into a control quantity so as to adjust and control a speed. The control module includes a first conversion unit 501 which performs a coordinate transformation on the sampled current of the first motor 12 to obtain an actual torque current component Iq2. In an example, the first conversion unit 501 transforms the sampled current into a torque current component Iq2 and an exciting current component Id2 through Clark transformation and Park transformation.

The target torque current component Iq1 and the actual torque current component Iq2 are used for controlling the torque so that the actual torque current component Iq2 is close to the target torque current component Iq1 and the torque can drive the rotor to rotate. For a direct current brushless motor, the torque current component generates a magnetic field whose direction is perpendicular to the rotor, and the rotor is subjected to the magnetic field generated by the torque current component which is orthogonal to a magnetic field of the rotor so that a rotation torque is generated and can drive the rotor to rotate. In a current transformation and decomposition process, a current component of the current which is parallel to a magnetic axis of the rotor (an exciting component Id) is also generated. However, a magnetic field generated by the exciting component Id is consistent with the magnetic field of the rotor and no torque is generated. Therefore, in order to obtain a maximum target torque current component Iq1, the exciting component Id should be minimized and is generally zero.

The control module further includes a second regulator 503. The second regulator 503 compares the target torque current component Iq1 with the actual torque current component Iq2 and performs adjustment according to a comparison result so as to acquire a control quantity of the first motor 12. Optionally, the second regulator 503 is implemented as a proportional-integral (PI) regulator. The PI regulator calculates, according to the target torque current component Iq1 and the actual torque current component Iq2, a corresponding torque voltage component Vq using an algorithm. A corresponding exciting voltage component Vd may be calculated according to an actual exciting current component Id1 and the target exciting current component Id2. The torque voltage component Vq and the exciting voltage component Vd are controlled to enable the actual torque current component Iq2 to reach the target torque current component Iq1 in a short time and be stabilized within a preset range of the target torque current component Iq1.

If the torque of the motor is to be always maximized, a magnetic field vector of a stator should be perpendicular to a magnetic field vector of the rotor. Since a magnitude and a direction of a magnetic field are directly related to a magnitude and a direction of a current, it is necessary to control a magnitude and a direction of a three-phase input current. However, if the current is controlled to generate a magnetic field of the stator which is perpendicular to the magnetic field of the rotor, it is necessary to control a vector of a three-phase input voltage and a vector of the current. Therefore, the control quantity of the first motor 12 here may be a current and/or a voltage, for example, a direction of the current and a magnitude of the voltage. Optionally, the PI regulator of the control quantity outputs the torque voltage component Vq as the control quantity of the first motor 12.

The control module further includes a PWM generation unit 505 and a second conversion unit 504. The second conversion unit 504 performs an inverse Park transformation on the torque voltage component Vq. The PWM generation unit 505 controls the torque of the electric motor by controlling the torque current component according to a transformation result of the second conversion unit and a corresponding PWM signal so that the electric motor is controlled to reach the target rotational speed stably within a preset time. The PWM signal corresponds to an adjusted input voltage and/or an adjusted input current, including the magnitude of the voltage, the direction of the current, and the like.

The driver circuit includes a frequency converter. The frequency converter drives the on/off states of the switching elements VT1 to VT6 in the switching circuit according to the generated PWM signal so as to supply power to coils of the phases in the first motor 12. Thus, the first motor 12 outputs an approximately sinusoidal current. Since the approximately sinusoidal current can be decomposed into the torque current component so that the actual torque current component can be controlled to be stabilized within the preset range of the target torque current component within the preset time, and thus the first motor 12 can respond within the preset time.

Figure 12:
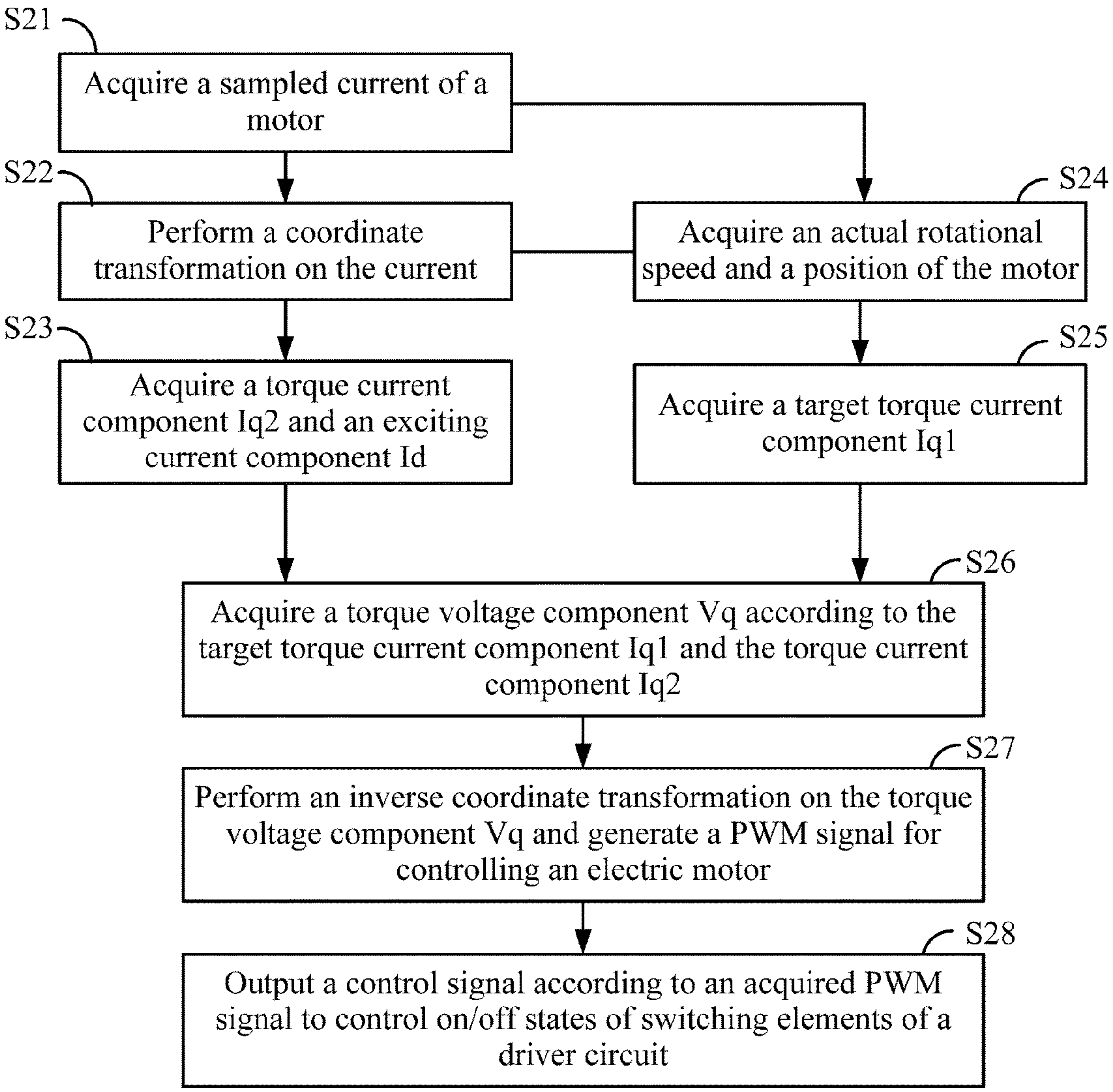
FIG. 12 illustrates a control flow of a walking control module of a riding lawn mower.

FIG. 12 illustrates a control flow of a walking control module of the riding lawn mower. Reference is made to FIG. 12.

In S21, the sampled current of the motor is acquired.

In S22, the coordinate transformation is performed on the current.

In S23, the torque current component Iq2 and an exciting current component Id are acquired.

In S24, the actual rotational speed and the position of the motor are acquired.

In S25, the target torque current component Iq1 is acquired.

In S26, the torque voltage component Vq is acquired according to the target torque current component Iq1 and the torque current component Iq2.

In S27, the inverse coordinate transformation is performed on the torque voltage component Vq and the PWM signal for controlling the electric motor is generated.

In S28, the control signal is outputted according to the acquired PWM signal to control the on/off states of the switching elements of the driver circuit.

Optionally, the second regulator 503, the first regulator 502, the first conversion unit 501, the PWM generation unit 505, and the second conversion unit 504 are disposed in the central controller 511.

Figure 10:
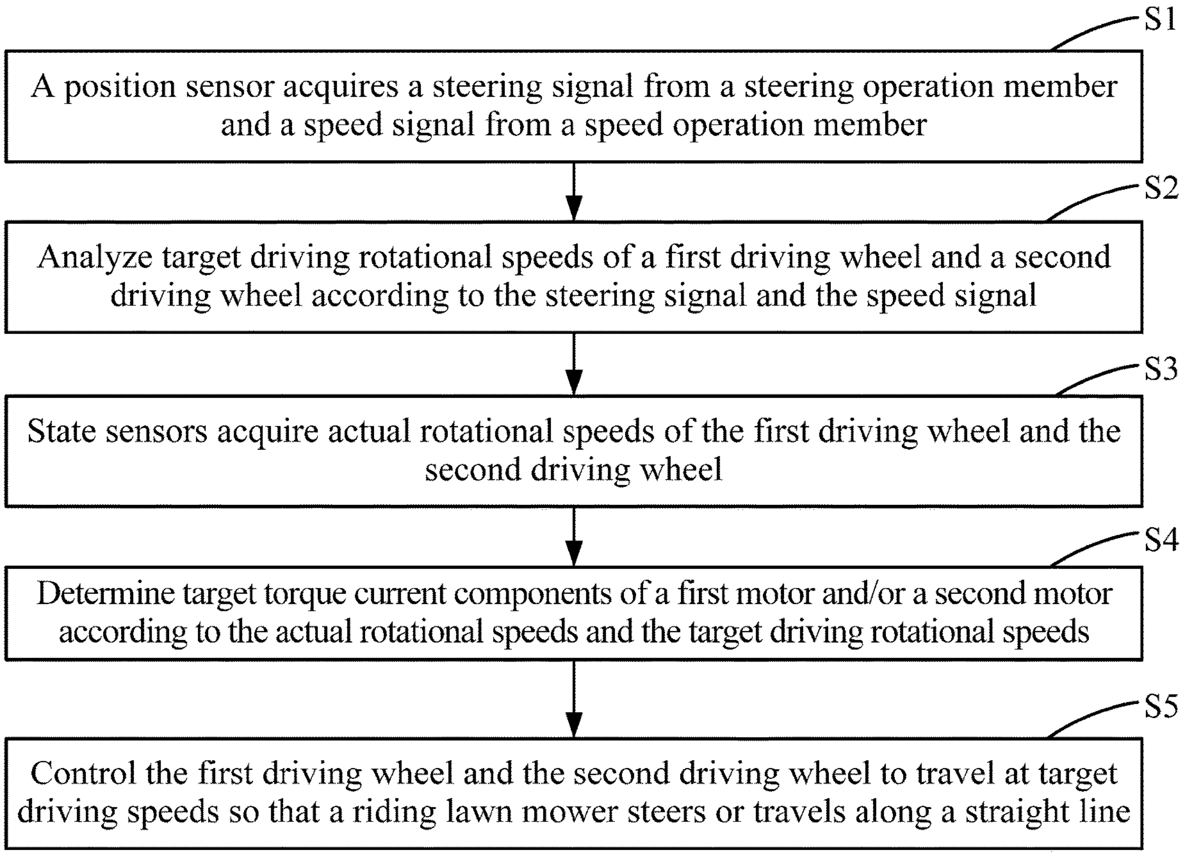
FIG. 10 illustrates a walking control method of a riding lawn mower.

In summary, FIG. 10 illustrates a walking control method of the riding lawn mower. Referring to FIG. 10, the walking control method of the riding lawn mower is provided and the method includes steps described below.

In S1, the position sensor 521 acquires the steering signal from the steering operation member and the speed signal from the speed operation member.

In S2, the target driving rotational speeds of the first driving wheel 1111 and the second driving wheel 1112 are analyzed according to the steering signal and the speed signal.

In S3, the state sensors 522 acquire the actual rotational speeds of the first driving wheel 1111 and the second driving wheel 1112.

In S4, the target torque current components of the first motor 12 and/or the second motor 13 are determined according to the actual rotational speeds and the target driving rotational speeds.

In S5, the first driving wheel and the second driving wheel are controlled to travel at the target driving rotational speeds.

Logics for the speed pedal controlling the traveling speed of the riding lawn mower may be as follows: when the speed of the riding lawn mower is zero, the user steps on the speed pedal to displace the speed pedal downwards and the position sensor 521 detects the displacement of the speed pedal and transmits the displacement to the control module of the riding lawn mower.

In an example, for example, the riding lawn mower is controlled to travel to the right. The second driving wheel 1112 is relatively disposed on a right side of the first driving wheel 1111. The user controls the riding lawn mower to travel at a target speed through the speed operation member. The control module controls the first motor 12 to output a corresponding target torque current component so that the first motor 12 drives the first driving wheel 1111 to rotate at a first speed which is equal to a target rotational speed. The control module calculates a second speed of the second driving wheel 1112, where the second speed is less than the first speed, and a difference between the second speed and the first speed is determined by an angle by which the steering wheel 21 is rotated by the user, that is, the steering instruction inputted by the user.

Thus, in a process during which the user operates the riding lawn mower to steer while going straight, a wheel on an outer side maintains the target speed inputted by the user through the speed operation member while a wheel on an inner side is decelerated relative to the original target speed. The wheel on the inner side is decelerated in the following manner: a corresponding motor is adjusted to output a negative torque current component. In this case, the motor outputs a negative torque and generates electricity. In addition, an energy recovery device may be provided to recover energy from the motor. For example, when the user rotates the steering wheel 21 to a relatively large degree which exceeds a threshold, the second speed may be negative. In this case, the motor corresponding to the wheel on the inner side outputs the negative torque current component and changes from a negative torque state to a reversely driving state so that the rotational speed of the wheel on the inner side is reduced from the target speed to a speed of zero and then is in a reverse direction of the target speed. In this case, the riding lawn mower is controlled to rotate around a point between the first driving wheel 1111 and the second driving wheel 1112 or a point on the first driving wheel 1111 or the second driving wheel 1112, which is a zero radius turn.

To make it convenient for the user to operate the riding lawn mower to perform the mowing task, the steering wheel 21 is provided with a first control region, a second control region, and a third control region when a rotation direction of the riding lawn mower corresponding to a rotation direction of the steering wheel 21 is calculated. The first control region, the second control region, and the third control region correspond to rotation angle intervals of the steering wheel 21. Using a direction corresponding to a non-rotation state of the steering wheel 21 as a start point, the first control region is formed on two sides of the start point, and the second control region and the third control region are sequentially away from the first control region and formed on the two sides of the start point.

When the user controls the rotation angle of the steering wheel 21 to be in the first control region, the central controller 511 sends the control instruction to the walking controller 512 so as to control the wheel on the inner side to be decelerated to a relatively small degree. In this case, the wheel on the inner side and the wheel on the outer side steer in the same direction so that the riding lawn mower travels to the left front or the right front correspondingly. When the user controls the steering wheel 21 to the second control region, the wheel on the inner side is controlled by the walking controller 512, the negative torque is applied to the wheel on the inner side, and the speed of the wheel on the inner side is reduced to the speed of zero. In this case, the riding lawn mower rotates with the wheel on the inner side as a center. When the user controls the steering wheel 21 to the third control region, the negative torque is applied to the wheel on the inner side so that the wheel on the inner side rotates in a reverse direction, that is, the wheel on the inner side rotates in an opposite direction relative to the wheel on the outer side. In this case, the wheel on the inner side and the wheel on the outer side rotate at speeds whose ratio is preset. The riding lawn mower rotates around a certain point on an axis between the rear wheels 111 so that zero radius rotation can be implemented.

Figure 6:
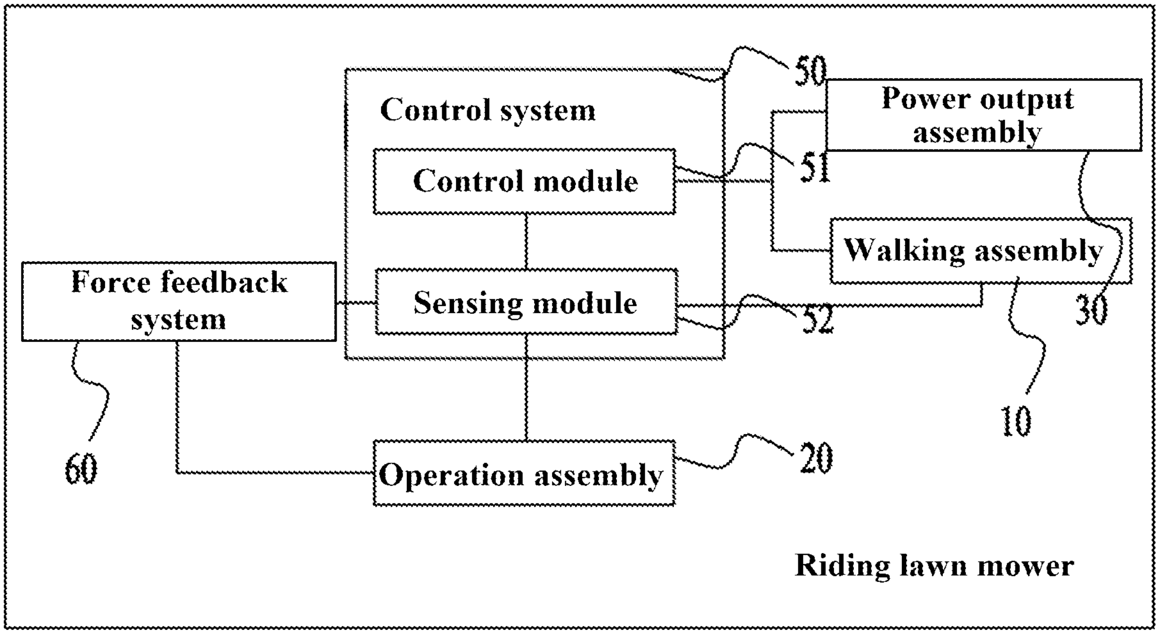
FIG. 6 is a block diagram of a force feedback system of a riding lawn mower according to an example of the present application.
Figure 8:
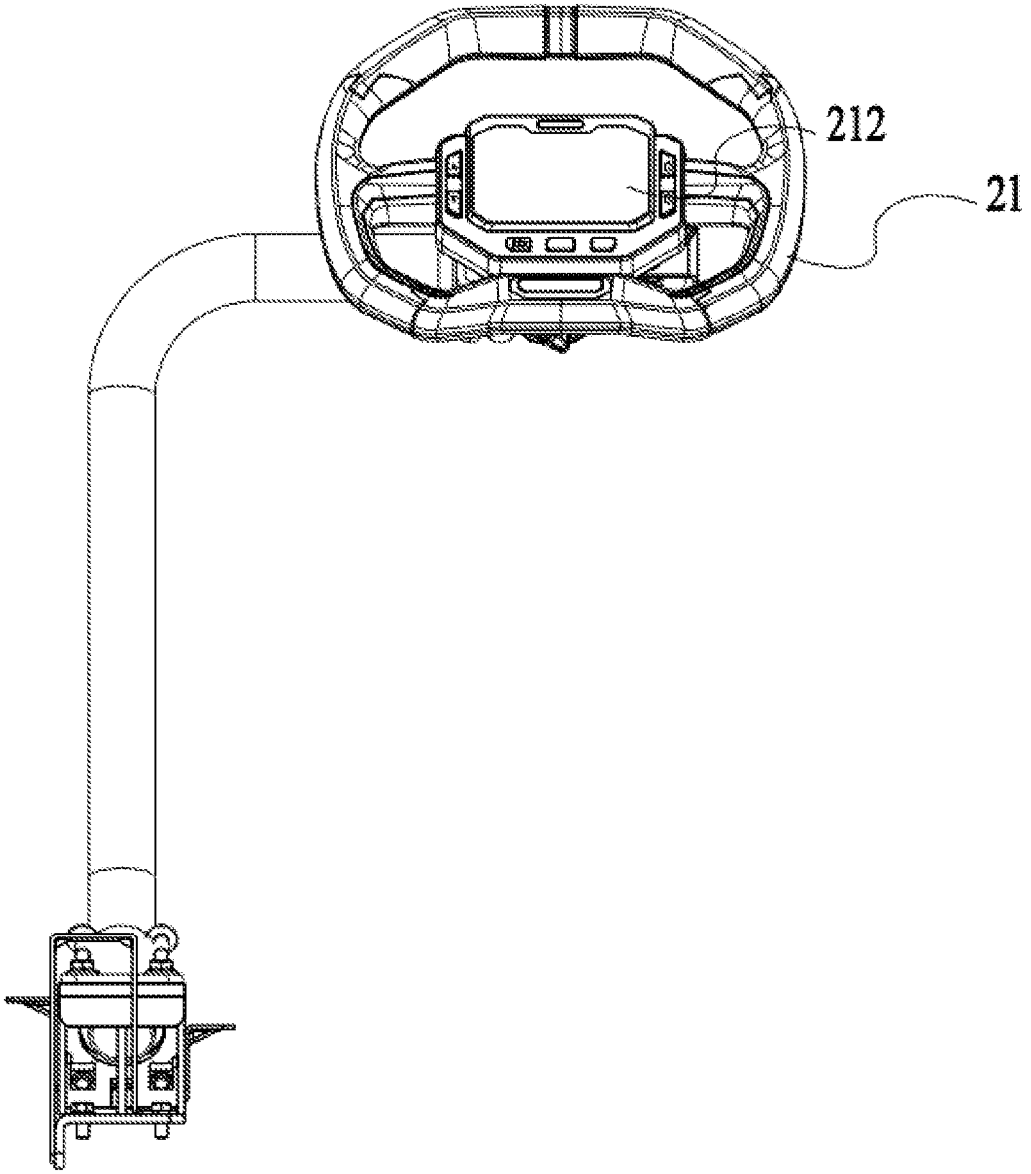
FIG. 8 is a perspective view of a steering wheel of a riding lawn mower according to an example of the present application.
Figure 9:
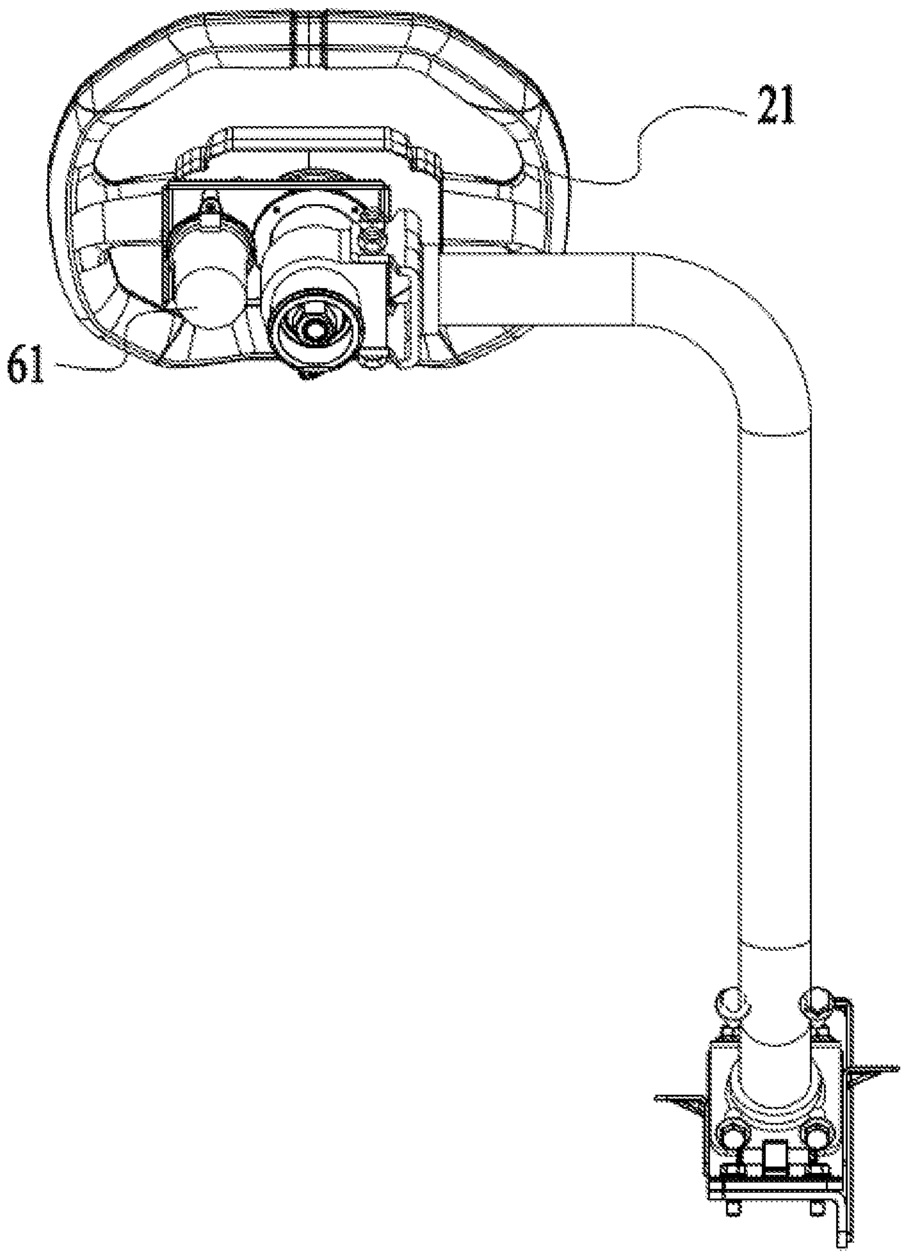
FIG. 9 is a perspective view of a steering wheel of a riding lawn mower from another angle according to an example of the present application.

In an example of the present application, FIG. 6 is a block diagram of a force feedback system of a riding lawn mower according to an example of the present application. FIG. 8 is a perspective view of a steering wheel 21 of a riding lawn mower according to an example of the present application. FIG. 9 is a perspective view of a steering wheel 21 of a riding lawn mower from another angle according to an example of the present application. The riding lawn mower further includes a force feedback system including the auxiliary motor 61 disposed adjacent to the steering wheel 21. The auxiliary motor 61 is connected to the steering wheel 21 through a pulley or a gear assembly so that the auxiliary motor 61 can apply a torque to the steering wheel 21 and the auxiliary motor 61 can also receive a torque applied by the user to the steering wheel 21. The state sensors 522 are connected to the central controller 511 and used for transmitting detection information of rotational speeds or torques of the driving wheels. The force feedback system further includes an auxiliary controller 62 which is connected to the central controller 511, receives information about rotation states of the driving wheels, and controls the auxiliary motor 61 to provide force feedback to the steering wheel 21 according to the information about the rotation states of the driving wheels. Optionally, the auxiliary motor 61 and the steering wheel 21 are connected through the pulley.

The force feedback system further includes an auxiliary controller which is connected to the steering wheel 21 through the auxiliary motor 61 so that the auxiliary motor 61 applies the torque to the steering wheel 21 and the steering wheel 21 has a function of automatically returning to an initial position of the steering wheel 21. A state sensor 522 disposed on the steering wheel 21 sends position information of the steering wheel 21 to an auxiliary sensor. The auxiliary sensor analyzes the position information of the steering wheel 21. When the steering wheel 21 is displaced relative to an original state of the steering wheel 21, the auxiliary sensor controls the auxiliary motor 61 to output a corresponding torque so as to drive the steering wheel 21 back to an original position of the steering wheel 21. Therefore, the auxiliary controller may also control the torque outputted by the auxiliary motor 61 by controlling a torque current component of the auxiliary motor 61 so that the steering wheel 21 is driven by the auxiliary motor 61 to have a force or a tendency to return to the initial position of the steering wheel 21 when the steering wheel 21 has the rotation displacement relative to the initial position of the steering wheel 21.

The steering wheel 21 is configured to rotate relative to the initial state of the steering wheel 21 in a first direction or a second direction. The first direction or the second direction refers to one of a clockwise direction and a counterclockwise direction. When the steering wheel 21 is driven to rotate in the first direction relative to the initial state of the steering wheel 21, the auxiliary sensor detects displacement information of the steering wheel 21 and transmits the displacement information to the auxiliary controller. The auxiliary controller analyzes the displacement information of the steering wheel 21 to calculate the torque to be provided by the auxiliary motor 61 to the steering wheel 21. The torque current component of the auxiliary motor 61 is adjusted to be positive or negative to control the auxiliary motor 61 to provide the torque in the second direction. A magnitude of the torque current component of the auxiliary motor 61 is controlled according to a displacement degree of the steering wheel 21, that is, the larger angle the steering wheel 21 rotates in the first direction, the larger torque the auxiliary motor 61 is controlled to provide. Thus, a driving force is provided to make the steering wheel 21 return to the initial position of the steering wheel 21. When the steering wheel 21 rotates in the second direction, the control logics are the same and will not be described in detail herein.

The auxiliary motor 61 is not only used for causing the steering wheel 21 to return to the initial position of the steering wheel 21 but also used for increasing resistance during the operation of the steering wheel 21 so that the following case is avoided: the steering wheel 21 excessively rotates when pushed by a relatively small force and the riding lawn mower has too high sensitivity; the steering wheel 21 excessively rotates when pushed by a relatively small force and the riding lawn mower rotates beyond control. Therefore, the control of traveling of the riding lawn mower by the user is optimized. In this manner, the force feedback is provided when the user operates the steering wheel 21 so that the user can acquire a current steering degree according to an operation feeling and resistance to the steering wheel 21.

Optionally, the auxiliary sensor acquires the rotation displacement of the steering wheel 21. Angular acceleration of the steering wheel 21 relative to a rotation center of the steering wheel 21 is calculated according to the operation of the steering wheel 21. A preset functional relationship is configured between the torque current component of the auxiliary motor 61 and the angular acceleration of the displacement of the steering wheel 21. Generally, the larger angular acceleration the steering wheel 21 has, the higher the torque current component of the auxiliary motor 61, that is, the greater force the user applies to the steering wheel 21, the greater resistance the auxiliary motor 61 provides. Thus, operation stability of the riding lawn mower is ensured and the following case is avoided: the user excessively rotates the steering wheel 21 so that the riding lawn mower steers beyond expectation. In this manner, the force feedback is provided when the user operates the steering wheel 21 so that the user can acquire the current steering degree according to the operation feeling and the resistance to the steering wheel 21.

Optionally, the state sensors 522 detect the torques or the rotational speeds of the first motor 12 and the second motor 13 so as to acquire the rotational speeds of the first driving wheel 1111 and the second driving wheel 1112. Alternatively, the position sensor 521 directly detects the rotational speeds of the first driving wheel 1111 and the second driving wheel 1112, and the auxiliary sensor acquires the rotational speeds of the first driving wheel 1111 and the second driving wheel 1112. Alternatively, the position sensor 521 disposed on the speed operation member detects a target rotational speed outputted by the user. The auxiliary motor 61 is controlled to output the corresponding torque according to the acquired target rotational speed or real-time rotational speeds of the wheels, and when the target rotational speed or the real-time rotational speeds of the wheels are higher, the auxiliary motor 61 is controlled to output the higher torque. That is, when the riding lawn mower travels at a higher speed, a greater force is needed to control the riding lawn mower to steer. The following case is avoided: the user controls the steering wheel 21 to rotate to too large a degree and the riding lawn mower steers to too large a degree when traveling at a high speed, causing accidents. Thus, operation safety of the riding lawn mower is improved.

An algorithm is configured in the auxiliary controller 62 which analyzes a magnitude and a direction of the force feedback of the corresponding auxiliary motor 61 according to the rotation state of the driving wheel. For example, when the riding lawn mower is operating, the driving wheel sometimes encounters an obstacle or a slight depression. In this case, the rotational speed or torque of the driving wheel is affected. The state sensor 522 detects the state of the driving wheel and feeds back the state of the driving wheel to the central controller 511 and then to the auxiliary controller 62. Alternatively, the state sensor 522 directly sends the state of the driving wheel to the auxiliary controller. The auxiliary controller 62 analyzes a traveling error between a current state of the wheel 11 and an expected state corresponding to the control instruction of the user. When the error is greater than a preset value, it is determined that a traveling state is abnormal. According to the traveling error, a feedback instruction corresponding to the steering wheel 21 is generated. The auxiliary motor 61 is controlled to drive, according to the feedback instruction, the steering wheel 21 to provide a corresponding torque so that the feedback for the steering wheel 21 is consistent with a current traveling state of the wheel 11. That is, when the riding lawn mower has a tendency to travel to the right, the force feedback is generated by the auxiliary motor 61 to the steering wheel 21 so as to control the steering wheel 21 to rotate to the right simultaneously or have a tendency to rotate to the right. The user perceives the displacement of the steering wheel 21 and controls the steering wheel 21 to be displaced in an opposite direction so as to correct a traveling posture of the riding lawn mower. Thus, the steering wheel 21 can effectively feed back information about the current traveling state of the riding lawn mower to the user, which can perform control in time during a traveling process and optimize driving experience of the user.

For example, the preset value corresponding to the traveling error between the current state of the wheel 11 and the expected state corresponding to the control instruction of the user may be zero, that is, the steering wheel 21 reflects the rotation state of the wheel in real time. For example, in a process of driving the riding lawn mower, the speed of the first driving wheel 1111 is reduced due to an obstacle, the auxiliary controller 62 analyzes that the speed of the first driving wheel 1111 is less than an expected speed and then generates the feedback instruction according to a speed difference of the first driving wheel 1111. The auxiliary motor 61 applies a force to the steering wheel 21 to form a certain obstacle for the user to control the steering wheel 21 so as to remind the user of the current state of the wheel 11. During a steering process of the wheels 11, the user may also be reminded of the current traveling state of the wheel 11 through the force feedback generated by the auxiliary motor 61.

Optionally, the algorithm configured in the auxiliary controller 62 and used for calculating a force feedback instruction may be configured in the central controller 511. The central controller 511 calculates the magnitude and the direction of the force feedback corresponding to the feedback instruction and transmits the feedback instruction to the auxiliary controller 62. The auxiliary controller 62 controls, according to the feedback instruction, the auxiliary motor 61 to operate and apply the torque to the steering wheel 21.

Optionally, the force feedback system further includes an auxiliary sensor 242 disposed in the auxiliary motor 61, where the auxiliary sensor 242 is connected to the auxiliary motor 61 and used for detecting an operation state of the auxiliary motor 61. Since the auxiliary motor 61 is directly coupled to the steering wheel 21 through the pulley or a gear and driven through the rotation of the steering wheel 21, the auxiliary sensor 242 may directly acquire the operation action of the user on the steering wheel 21 by detecting a rotation state of the auxiliary motor 61 to acquire a steering control instruction of the user and send the steering control instruction to the central controller 511.

In an example, the auxiliary controller controls the auxiliary motor 61 to output the force feedback. The force feedback has an adjustment factor for adjusting the magnitude of the force feedback of the auxiliary motor 61 to the steering wheel 21 through the control of the torque current component. The auxiliary controller is connected to the sensing module to acquire the rotation angle of the steering wheel 21, the angular acceleration of rotation of the steering wheel 21, the rotational speeds of the wheels, and the differential speed between the first driving wheel 1111 and the second driving wheel 1112 detected by the sensing module. Initial values are configured for the preceding items. When the rotation angle of the steering wheel 21, the angular acceleration of rotation of the steering wheel 21, the rotational speeds of the wheels, and the differential speed between the first driving wheel 1111 and the second driving wheel 1112 are greater than the initial values, the adjustment factor is increased separately according to pre-algorithms and the final adjustment factor is obtained. Thus, the torque outputted by the auxiliary motor 61 is controlled according to the adjustment factor and transmitted to the steering wheel 21 as the force feedback to notify a current traveling state of the riding lawn mower to the user. Resistance to rotation by the user is increased adaptively to increase control stability and safety.

Figure 11:
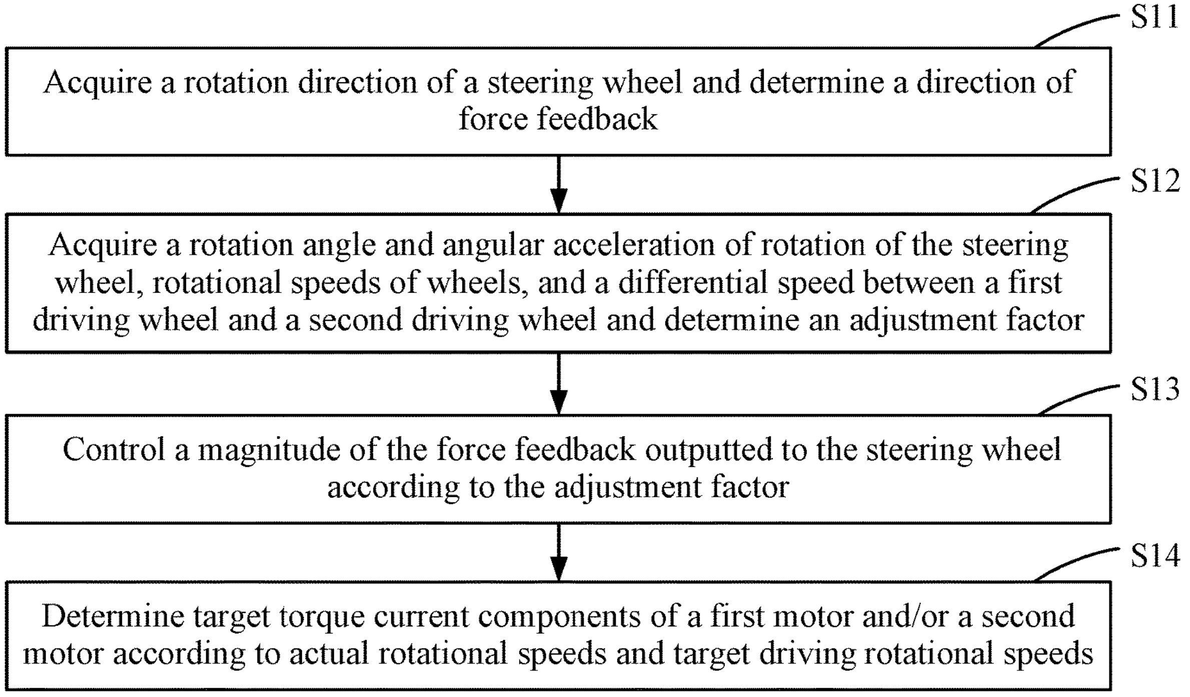
FIG. 11 illustrates a method for controlling force feedback for a steering wheel of a riding lawn mower.

FIG. 11 illustrates a method for controlling the force feedback for the steering wheel 21 of the riding lawn mower. Referring to FIG. 11, the method for controlling the force feedback for the steering wheel 21 of the riding lawn mower is provided.

In S11, the rotation direction of the steering wheel 21 is acquired and the direction of the force feedback is determined.

In S12, the rotation angle and the angular acceleration of rotation of the steering wheel 21, the rotational speeds of the wheels, and the differential speed between the first driving wheel 1111 and the second driving wheel 1112 are acquired and the adjustment factor is determined.

In S13, the magnitude of the force feedback outputted to the steering wheel 21 is controlled according to the adjustment factor.

Optionally, to improve heat dissipation performance of the auxiliary motor 61, the auxiliary motor 61 is provided with a heat dissipation fan for dissipating heat of the auxiliary motor 61, which prevents the auxiliary motor 61 from stopping working due to overheating or prevents performance of the auxiliary motor 61 from being affected due to overheating. The heat dissipation fan may be configured to be coaxially connected to an electric motor shaft of the auxiliary motor 61 and driven to rotate to dissipate the heat of the auxiliary motor 61.

In another example of the present application, a damping member is disposed in the steering wheel 21, where the damping member is made of a damping material or implemented as a damper such as a damping hinge. The damping member increases resistance to the rotation of the steering wheel 21, which avoids the following case: the steering wheel 21 excessively rotates when pushed by a relatively small force and that the riding lawn mower has too high sensitivity. Therefore, the control of traveling of the riding lawn mower by the user is optimized.

In some examples of the present application, the position sensor 521 includes the rotation member and the fixed member which are disposed opposite to each other. The rotation member is disposed in the operation plate 211 and the fixed member is disposed adjacent to the shaft body or the auxiliary motor 61. The rotation member is driven by the user to rotate, and the relative position relationship between the rotation member and the fixed member is changed so that the operation action of the user on the steering wheel 21 is acquired. Optionally, the fixed member and the rotation member are implemented as the Hall sensor, that is, the Hall sensor is disposed in the fixed member, and at least part of the rotation member is provided as the magnetic member so that the rotation of the steering wheel 21 is detected through the Hall principle. In another example, the rotation member and the fixed member are provided as capacitors, and the rotation state of the steering wheel 21 is read through a circuit change.

In some examples of the present application, the signal wire is disposed in the shaft body and used for connecting the position sensor 521 to the central controller 511. The signal wire is implemented as a spring-like signal wire which can effectively adapt to rotation of the signal wire driven by the rotation of the steering wheel 21 and greatly prolong a service life of the signal wire.

In some examples of the present application, the operation assembly further includes a display screen 212 disposed on the steering wheel 21. The display screen is connected to the central controller 511 in a wireless or wired manner. A button is disposed in the display screen for the user to operate the riding lawn mower. In an example, the display screen 212 is disposed above the steering wheel 21 and independent of the steering wheel 21 so that the display screen is not driven to rotate with the rotation of the steering wheel 21.

Optionally, a control button is disposed on the steering wheel and used for controlling the riding lawn mower to reverse. The control button may be provided as a toggling piece. When the user needs to operate the riding lawn mower to reverse, the user switches the riding lawn mower to a reverse mode by toggling the toggling piece. After receiving a reverse control instruction transmitted by the control button, the central controller 511 controls the torque current components outputted by the first motor 12 and the second motor 13 to be negative values. In a process where steering is not performed, the same torque current components are outputted so that the first motor 12 and the second motor 13 simultaneously changes to the reversely driving state, and the first driving wheel 1111 and the second driving wheel 1112 are driven to reverse so that a reserve action of the riding lawn mower is implemented.

Figure 15:
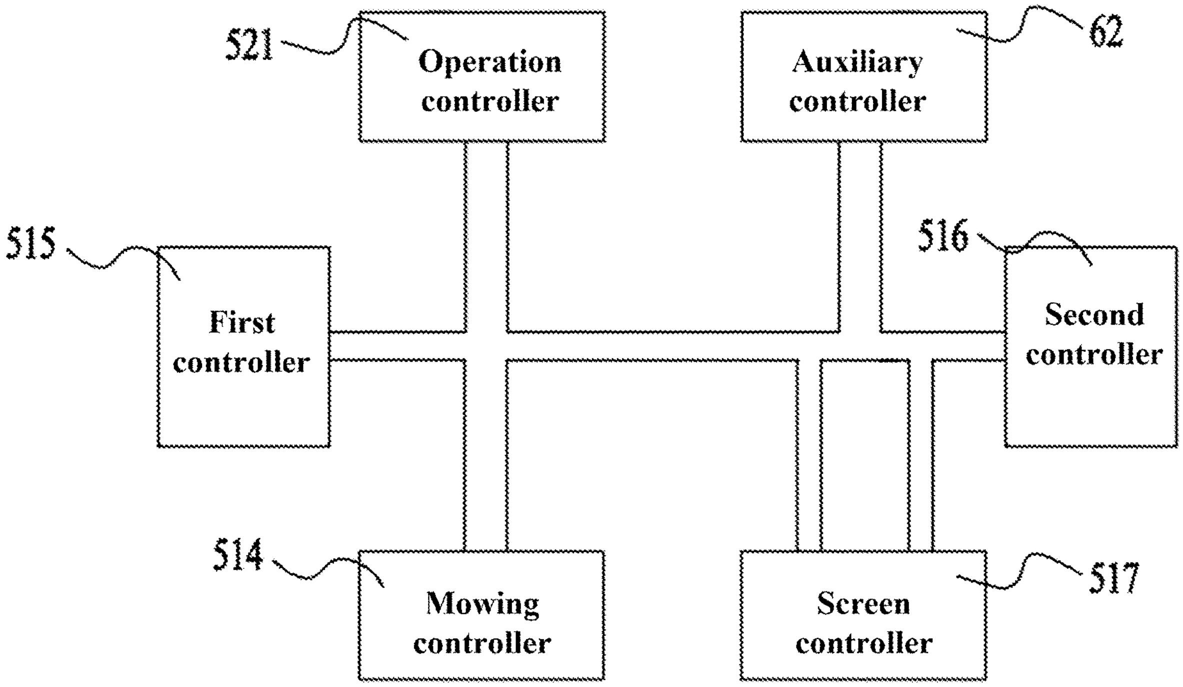
FIG. 15 is a block diagram of an example of another control system of the present application.

Reference is made to FIG. 15 which is a block diagram of an example of another control system of the present application. The control system may not include the central controller, that is, the control module includes the auxiliary controller, the mowing controller 514, the walking controllers which may include the first controller and the second controller, the operation controller, and sensors including the position sensor, the state sensors, and the like. The preceding controllers and sensors are communicatively connected through a bus and transmit information in a unidirectional manner, that is, the sensor has a function of merely receiving or transmitting information. Optionally, the control system further includes a display screen controller 517 which is connected in a bidirectional manner to the bus. The display screen controller 517 is connected to the display screen to control the display screen to display contents, acquires a control instruction of the user to the riding lawn mower through the display screen, and transmits an instruction of the user through the bus.

Contents provided in the present application can be applied to not only the riding lawn mower but also other electric riding machines which work indoors or outdoors. Here, in addition to devices that output power for walking on the ground, devices that can output power in other forms to implement other functions are considered as electric riding machines such as riding snow throwers, riding agricultural machines, riding mops, riding sweepers. In fact, as long as these tools include the substance described above in the present application, these tools all fall within the scope of the present application.

The riding lawn mower further includes a battery pack for supplying energy and a battery pack mounting slot so that the battery pack 141 can also provide an energy source to an electric tool. That is, the battery pack 141 in the present application may be applied to not only the riding lawn mower but also another electric tool. Thus, adaptability of the battery pack 141 is improved and a capability of the riding lawn mower to adapt to the battery pack 141 is also improved. In this manner, when the riding lawn mower is not in use, the user can disassemble the battery pack 141 and apply the battery pack 141 to another electric tool, which avoids a waste of resources and reduces a usage cost. In other words, when the user needs to use the riding lawn mower, the user can use the battery pack 141 in another electric tool as the battery pack 141.

In another example of the present application, a riding lawn mower is provided and includes a blade, a main body, an operation assembly, a target speed input unit, a universal wheel group, a drivable wheel group, a walking drive motor group, an actual position detection unit, and a main control unit. The blade is configured to mow grass. The main body is configured to support the blade and includes at least one bracket mounted on the riding lawn mower. The operation assembly includes a steering wheel coupled to the main body of the riding lawn mower. The target speed input unit is coupled to the steering wheel and configured to generate an instruction signal of a target speed. The universal wheel group is coupled to a front side of at least one bracket. The drivable wheel group is coupled to a rear side of at least one bracket and includes a left drivable wheel and a right drivable wheel. The walking drive motor group is coupled to the drivable wheel group and at least includes a left drive motor coupled to one drivable wheel in the drivable wheel group and a right drive motor coupled to one drivable wheel in the drivable wheel group. The actual position detection unit is associated with the left drivable wheel and the right drivable wheel and configured to generate actual position signals of the left drivable wheel and the right drivable wheel respectively. The main control unit includes one or more controllers and is electrically connected to the target speed input unit, the actual position detection unit, and the walking drive motor group, where the main control unit outputs driving control signals corresponding to the left drive motor and the right drive motor respectively according to the instruction signal generated by the target speed input unit and the actual position signals generated by the actual position detection unit, which are obtained by the main control unit, so that the left drivable wheel and the right drivable wheel make small radius turn or substantially zero radius turn at different speeds. The steering wheel includes a fixed member, a rotation member rotating with respect to the fixed member, and a spring-like signal wire, the fixed member has a first surface, the rotation member includes a second surface opposite to the first surface, and the spring-like signal wire is electrically connected between the first surface of the fixed member and the second surface of the rotation member.

What is claimed is:

1. A riding lawn mower, comprising:

a seat for a user to ride on;

a power output assembly comprising a mowing element configured to output power so as to implement a mowing function and a power output motor configured to drive the mowing element to output the power;

a walking assembly comprising wheels driving the riding lawn mower to walk on a ground, walking motors configured to drive the wheels, and walking controllers controlling the walking motors, wherein the wheels comprise two driving wheels; and a control assembly comprising a central controller;

wherein the riding lawn mower further comprises an operation assembly comprising an electronic steering wheel and a position sensor, the position sensor comprises a fixed member, a rotation member rotating with respect to the fixed member, and a signal wire coupled between the fixed member and the rotation member, the fixed member has a first surface and the rotation member comprises a second surface opposite to the first surface, the position sensor is configured to detect a rotation operation action of the user on the electronic steering wheel, and the central controller is communicatively connected to the position sensor, acquires a rotation operation instruction, and controls the two driving wheels to actively travel at different speeds for steering through the walking controllers.

2. The riding lawn mower according to claim 1, wherein the two driving wheels are rear wheels.

3. The riding lawn mower according to claim 1, wherein the signal wire is a spring-like signal wire electrically connected between the first surface of the fixed member and the second surface of the rotation member.

4. The riding lawn mower according to claim 1, further comprising a force feedback sensor associated with an at least one of the two driving wheels and configured to detect a resistance fluctuation state of the at least one of the two driving wheels.

5. The riding lawn mower according to claim 4, further comprising an auxiliary electric motor coupled to the electronic steering wheel and an auxiliary controller electrically connected to the auxiliary electric motor and the force feedback sensor, wherein the auxiliary controller outputs a control signal corresponding to the resistance fluctuation state to the auxiliary electric motor by receiving the resistance fluctuation state of the at least one of the two driving wheels detected by the force feedback sensor.

6. The riding lawn mower of claim 1, wherein the operation assembly further comprises a speed operation member and the speed operation member is connected to the central controller and configured to control acceleration.

7. The riding lawn mower of claim 1, wherein the central controller is configured to apply a negative torque to an at least one of the two driving wheels on an inner side in a rotation process to decelerate the at least one of the two driving wheels on the inner side for steering.

8. The riding lawn mower of claim 1, wherein the walking assembly comprises a first motor and a second motor for respectively driving first and second ones of the two driving wheels.

9. The riding lawn mower of claim 8, wherein the walking assembly further comprises state sensors for detecting states of the first motor and the second motor.

10. The riding lawn mower of claim 9, wherein the state sensors comprise current sensors for acquiring currents used by the first motor and the second motor.

11. The riding lawn mower of claim 9, wherein the state sensors comprise position sensors for detecting rotational speeds of the first motor and the second motor.

12. The riding lawn mower of claim 9, wherein the state sensors comprise pressure sensors for detecting torques of the first motor and the second motor.

13. The riding lawn mower of claim 9, wherein the operation assembly further comprises an auxiliary motor and an auxiliary controller controlling the auxiliary motor, wherein the auxiliary motor is coupled to the electronic steering wheel, and the auxiliary controller generates a feedback instruction according to the states of the first motor and the second motor detected by the state sensors and controls the auxiliary motor to apply force feedback to the electronic steering wheel.

14. A riding lawn mower, comprising:

a seat for a user to ride on;

a power output assembly comprising a mowing element configured to output power so as to implement a mowing function and a power output motor configured to drive the mowing element to output the power;

a walking assembly comprising wheels driving the riding lawn mower to walk on a ground, walking motors configured to drive the wheels, and walking controllers controlling the walking motors, wherein the wheels comprise two driving wheels; and a control assembly comprising a central controller;

wherein the riding lawn mower further comprises an operation assembly comprising an electronic steering wheel and a position sensor, the position sensor is configured to detect a rotation operation action of the user on the electronic steering wheel, and the central controller is communicatively connected to the position sensor, acquires a rotation operation instruction, and controls the two driving wheels to actively travel at different speeds for steering through the walking controllers;

wherein the electronic steering wheel comprises a fixed member, a rotation member rotating with respect to the fixed member, and a spring-like signal wire, the fixed member has a first surface, the rotation member comprises a second surface opposite to the first surface, and the spring-like signal wire is electrically connected between the first surface of the fixed member and the second surface of the rotation member.

15. A riding lawn mower, comprising:

a seat for a user to ride on;

a power output assembly comprising a mowing element configured to output power so as to implement a mowing function and a power output motor configured to drive the mowing element to output the power;

a walking assembly comprising wheels driving the riding lawn mower to walk on a ground, walking motors configured to drive the wheels, and walking controllers controlling the walking motors, wherein the wheels comprise two driving wheels;

an operation assembly comprising: an electronic steering wheel comprising an operation plate coupled to a shaft body; a position sensor configured to detect a rotation operation action of the user on the electronic steering wheel; and a spring-like wire disposed in the shaft body and connected to the position sensor; and a central controller communicatively connected to the position sensor that acquires a position signal from the position sensor via the spring-like wire and that uses the position signal to control the two driving wheels to actively travel at different speeds for steering through the walking controllers.

* * * * *